United States Patent
Mahajan et al.

(10) Patent No.: US 8,165,044 B2
(45) Date of Patent: Apr. 24, 2012

(54) MAINTAINING MULTIPLE, SIMULTANEOUS WIRELESS NETWORK CONNECTIONS USING A SINGLE RADIO

(75) Inventors: Saurabh Mahajan, Redmond, WA (US); Taroon Mandhana, Redmond, WA (US); Abhishek Abhishek, Woodinville, WA (US); Mitesh K. Desai, Redmond, WA (US); Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 718 days.

(21) Appl. No.: 11/874,962

(22) Filed: Oct. 19, 2007

(65) Prior Publication Data

US 2009/0103481 A1  Apr. 23, 2009

(51) Int. Cl.
 H04B 7/005 (2006.01)
 H04L 12/28 (2006.01)
(52) U.S. Cl. .................................... 370/278; 370/401
(58) Field of Classification Search .................... None
 See application file for complete search history.

(56) References Cited

U.S. PATENT DOCUMENTS

| | | | |
|---|---|---|---|
| 7,013,138 | B2 | 3/2006 | Mahany |
| 7,074,893 | B2 | 7/2006 | Holoshitz et al. |
| 7,146,133 | B2 | 12/2006 | Bahl et al. |
| 2004/0218580 | A1 | 11/2004 | Bahl et al. |
| 2005/0063328 | A1* | 3/2005 | Dunagan et al. ............ 370/324 |
| 2005/0165916 | A1 | 7/2005 | Cromer et al. |
| 2005/0170776 | A1 | 8/2005 | Siorpaes |
| 2006/0013159 | A2* | 1/2006 | Gurevich ................... 370/328 |
| 2006/0182145 | A1 | 8/2006 | Seo et al. |
| 2006/0193295 | A1 | 8/2006 | White et al. |
| 2006/0209821 | A1* | 9/2006 | Jung et al. ................. 370/389 |
| 2007/0066359 | A1 | 3/2007 | Zhuang |
| 2007/0081477 | A1 | 4/2007 | Jakkahalli et al. |
| 2007/0109989 | A1* | 5/2007 | Nakagawa et al. ......... 370/328 |
| 2008/0008141 | A1* | 1/2008 | Tchigevsky et al. ....... 370/338 |
| 2008/0062922 | A1* | 3/2008 | Qi ............................ 370/331 |
| 2008/0069065 | A1* | 3/2008 | Wu et al. ................... 370/340 |
| 2008/0240026 | A1* | 10/2008 | Shih et al. ................. 370/329 |
| 2008/0240142 | A1* | 10/2008 | Belgaied et al. ............ 370/420 |

(Continued)

FOREIGN PATENT DOCUMENTS

WO  WO2007071277 A1  6/2007

OTHER PUBLICATIONS

International Search Report dated May 20, 2009 from corresponding International Application No. PCT/US2008/077506.

(Continued)

*Primary Examiner* — Hassan Phillips
*Assistant Examiner* — Eunsook Choi
(74) *Attorney, Agent, or Firm* — Wolf, Greenfield & Sacks, P.C.

(57) ABSTRACT

A method and apparatus for managing simultaneous virtual connections with multiple wireless networks. A plurality of ports in a hardware driver may be each associated with a corresponding wireless network and maintain a unique MAC state relative to other ports. Each port may have a corresponding virtual NIC that communicates directly with the radio hardware via a hardware virtualization layer that multiplexes communication between the virtual NICs and the radio hardware. Simultaneous virtual connections may be made with one or more infrastructure networks or adhoc networks, and/or the computer may function as an access point for one or more of the networks.

19 Claims, 1 Drawing Sheet

U.S. PATENT DOCUMENTS

| | | | |
|---|---|---|---|
| 2008/0271134 A1* | 10/2008 | Johnson et al. | 726/13 |
| 2009/0046673 A1* | 2/2009 | Kaidar | 370/337 |
| 2009/0059934 A1* | 3/2009 | Aggarwal et al. | 370/401 |
| 2009/0063706 A1* | 3/2009 | Goldman et al. | 709/250 |

OTHER PUBLICATIONS

Chandra et al., MultiNet: Connecting to Multiple IEEE 802.11 Networks Using a Single Wireless Card, Infocom 2004, 23$^{rd}$ Annual Joint Conf. of the IEEE Comp. and Comm Soc., vol. 2, pp. 882-893, Mar. 2004.

Chereddi et al., Design and Implementation of a Multi-Channel Multi-Interface Network, Realman '06, Florence, Italy, May 2006.

Adya et al., A Multi-Radio Unification Protocol for IEEE 802.11 Wireless Networks, Broadnets 2004, First Int'l. Conf. on Broadband Networks, pp. 344-354, Oct. 2004.

Frodigh, et al., Wireless ad hoc networking—The art of networking without a network, Ericsson Review No. 4, 2000, pp. 248-263, 2000.

* cited by examiner

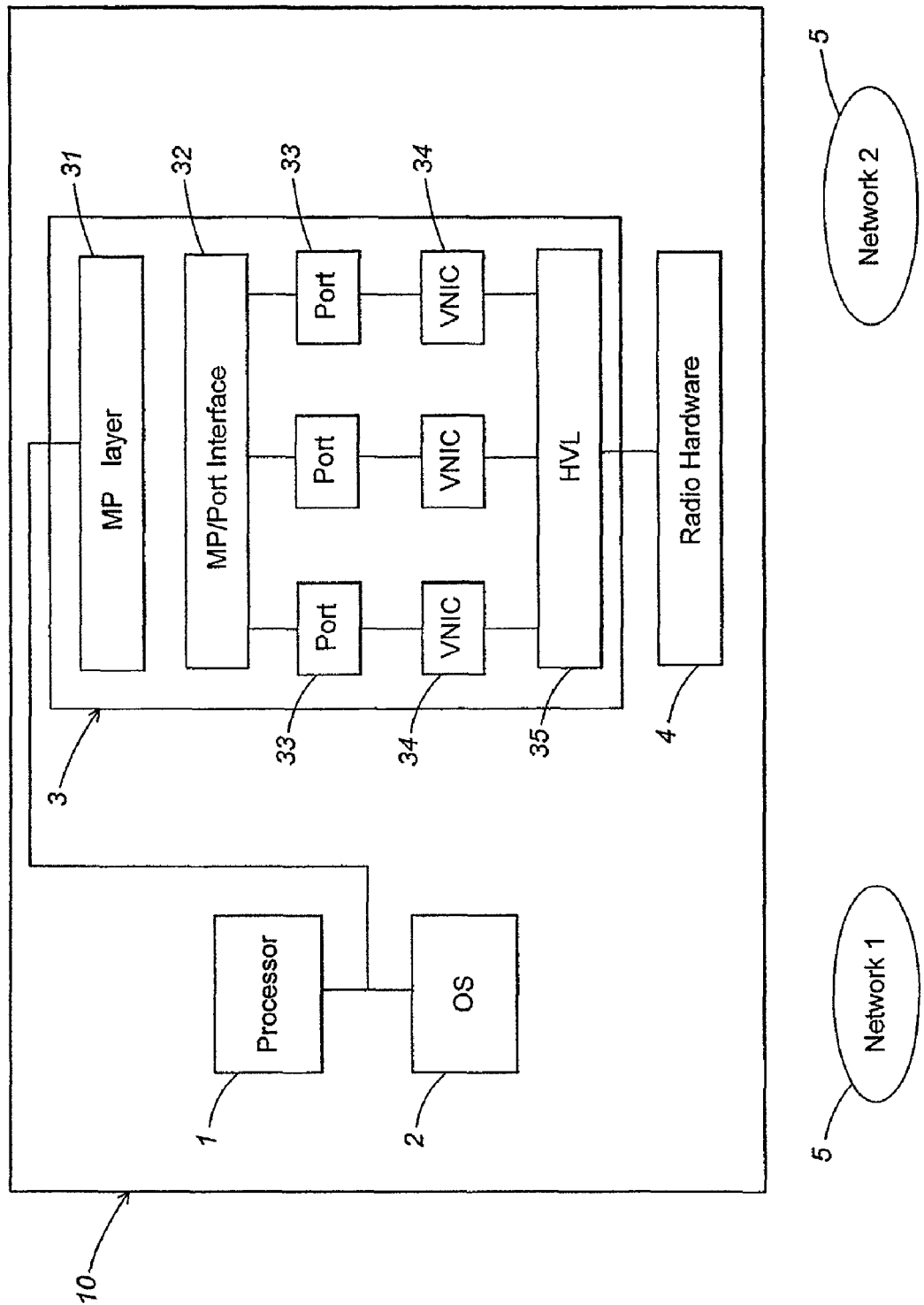

MAINTAINING MULTIPLE, SIMULTANEOUS WIRELESS NETWORK CONNECTIONS USING A SINGLE RADIO

BACKGROUND

1. Field of Invention

This invention relates to maintaining multiple, simultaneous virtual connections with a plurality of wireless networks using a single radio.

2. Related Art

In general, a device having a single radio suited for communication with a wireless network is only capable of maintaining a connection with a single wireless network at any one time. Communication with two or more wireless networks typically requires that the device disconnect from a first wireless network, then establish a new connection with the second wireless network so as to communicate on the second wireless network. To engage again in communication on the first wireless network, the device must disconnect from the second wireless network and reestablish connection with the first wireless network.

Establishing a simultaneous connection with two or more wireless networks can be desirable in many situations, such as when a computer is connected to the Internet via a first wireless network and the user wishes to establish a connection in a peer-to-peer network, e.g., to exchange information with a camera or other device. However, disconnection from the first wireless network so as to establish a connection in the peer-to-peer network and obtain the desired information, and then reestablishing a connection with the first wireless network can be not only time consuming, but may prevent a user from engaging in certain activities, such as sharing live video from a camera received via a peer-to-peer network with another device via an Internet or other network connection.

SUMMARY OF INVENTION

Aspects of the invention provide the ability for a computer to maintain a simultaneous connection (whether virtual and/or actual) with a plurality of wireless networks using a single radio. Accordingly, in one embodiment, a computer may establish both a connection with a first wireless network (such as an 802.11 wireless network via which the computer may connect with the Internet) at the same time that the computer maintains a connection with a second wireless network (such as a wireless mesh network including one or more other devices). The computer may maintain these two or more connections to wireless networks using a single radio. Accordingly, in accordance with at least one aspect of the invention, a computer may support functions possible only with connections to two or more wireless networks without requiring multiple radios. For example, a computer may establish two or more connections with two or more wireless networks while the computer is moving (e.g., while traveling in a vehicle) and switch seamlessly between networks if a connection with one of the networks degrades. Thus, the computer may effect a seamless handoff between networks in the event of poor network connectivity. In another embodiment, a computer may participate in two wireless mesh networks or other adhoc networks and serve as a bridge or other interconnection between the networks. In an other embodiment, a computer may function as an access point for a first wireless network while also maintaining a simultaneous connection in a second wireless network.

In one aspect of the invention, a computer includes a processor for executing instructions and a set of computer executable instructions that, when executed by the processor, form a single operating system for the computer. The computer may also include a radio constructed and arranged to send and receive wireless signals for communication with at least one device in a wireless network, and a plurality of ports that are each respectively associated with a corresponding wireless network. Each port may maintain a MAC state that is unique from all other ports associated with a respective wireless network and may handle signals regarding wireless signals to be sent by the radio to, and received from, the wireless network associated with the port. The computer may be adapted to maintain a simultaneous virtual connection with two or more wireless networks via the radio, e.g., the computer may maintain a virtual connection with an 802.11 infrastructure network as well as an adhoc network. The MAC state for each port may be defined at least in part by a MAC address that is unique from MAC addresses associated with other ports that are associated with a respective wireless network. In other embodiments, ports having a different MAC state may actually have a same MAC address, yet have other components of the MAC state differ, such as a run-time state and/or state engine that are used in communications with a 802.11 wireless network. In some embodiments, it is possible for two ports to have a same MAC state that is different from the MAC state of other ports.

In one embodiment, the computer may send and/or receive wireless signals on a first network on a first channel, and then send and/or receive wireless signals on a second network on the first channel without disconnecting from the first network. If the first network requires authentication or other security protocols be performed before communication with the network, the computer may communicate with the first network, then communicate with a second wireless network, then communicate again with the first wireless network without again performing an authentication procedure for a second time.

In another aspect of the invention, a network miniport driver for a computer may include a hardware interface that is adapted to communicate directly with radio hardware to provide control signals to the radio hardware and to receive information regarding wireless signals received by the radio hardware from one or more wireless networks. The miniport driver may include a plurality of ports that are each associated with a unique wireless network and that each maintain a MAC state that is different from the MAC state of other ports. A plurality of virtual NICs may each be respectively associated with a wireless network and the corresponding port, and each of the virtual NICs may be adapted to send and receive signals for the corresponding port regarding wireless communications on the wireless network. A hardware virtualization layer may multiplex connections between virtual NICs and the radio hardware to allow direct communication between a virtual NIC and the radio hardware.

In another aspect of the invention, a method of managing communication of a computer with multiple wireless networks via radio hardware may include creating a plurality of ports that are each associated with a unique wireless network, where each of the ports maintains a MAC state that is different from the MAC state of other ports. A plurality of virtual NICs may each be respectively associated with a corresponding port and wireless network, and be adapted to send and receive signals for the corresponding port regarding wireless communications on the wireless network. A hardware virtualization layer may be provided that multiplexes connections between the virtual NICs and the radio hardware to allow direct communication between a virtual NIC and the radio hardware.

These and other aspects of the invention will be apparent from the following detailed description and claims.

BRIEF DESCRIPTION OF THE DRAWINGS

Aspects of the invention are described with reference to illustrative embodiments in the following drawings in which like numerals reference like elements, and wherein:

FIG. 1 is a schematic block diagram of a computer configured in accordance with aspects of the invention that may communicate with two or more wireless networks.

DETAILED DESCRIPTION

Aspects of the invention are described below with reference to illustrative embodiments. However, it should be appreciated that aspects of the invention are not limited to any of the particular embodiments described. For example, embodiments are described below regarding communication of a computer with two or more wireless networks. However, it should be appreciated that the term computer as used herein refers to any suitable device configured in accordance with aspects of the invention, such as a Personal Digital Assistant (PDA), cellular telephone, laptop computer, or other device. In addition, examples are provided below regarding a computer operating in accordance with a Windows-based operating system. However, it should be understood that aspects of the invention may be extended to devices using any suitable operating system, not just a Windows-based operating system. Also, embodiments below are described in which a computer includes a single radio for communicating with wireless networks. However, it should be understood that the computer may include two or more radios, but the computer may be configured so as to be able to use a single radio to maintain a connection with two or more wireless networks.

FIG. 1 is a schematic block diagram illustrating a computer 10 configured in accordance with aspects of the invention. In this illustrative embodiment, the computer 10 includes a central processing unit (a CPU or processor) 1 that implements software instructions related to an operating system 2 for the computer 10, as well as other system components such as one or more applications, etc. In this illustrative embodiment, the operating system 2 includes a set of software code or other instructions that are executed by the processor 1, but the operating system 2 in other embodiments may include firmware, dedicated circuitry or other components in addition to, or in place of suitable software code. Although not shown in FIG. 1, the computer 10 may also include other suitable devices, software, or other components to enable the computer 10 to perform desired input/output or other functions. For example, the computer 10 may include one or more data storage devices (such as volatile or non-volatile memory devices), a display (such as an LCD screen or other), user input devices (such as a keyboard, user pointing device, touch screen, etc.), software components to generate and control a graphical user interface (GUI), and so on.

In accordance with aspects of the invention, the computer 10 includes a network miniport driver 3 that interacts with the operating system 2 and radio hardware 4 so as to allow the computer 10 to perform desired functions with respect to communication with wireless networks 5, e.g., allows the computer 10 to maintain simultaneous virtual connections with two or more wireless networks. Although the component at reference numeral 3 is referred to herein as a network miniport driver, other terminology may be used to refer to a component that performs the functions of the miniport driver 3 as described herein. That is, in other embodiments, a component or collection of components that receive instructions from an operating system and implement those instructions to enable radio hardware to function as described herein may be referred to with other names, yet should be interpreted as corresponding to a network miniport driver.

In this illustrative embodiment, the miniport driver 3 includes a miniport layer (MP LAYER) 31 which handles interaction between the operating system 2 and the miniport driver 3. An MP/PORT INTERFACE 32 handles communications between the MP LAYER 31 and a plurality of ports 33. As will be described in more detail below, each of the ports 33 may be associated with a corresponding wireless network, and thus control communications between the radio hardware 4 and the corresponding wireless network 5. In accordance with an aspect of the invention, each port 33 may maintain a corresponding MAC state required for a wireless client to connect with the corresponding wireless network 5, and the MAC state may be unique relative to the MAC state of other ports 33. It is this feature, at least in part, this enables the miniport driver 3 in accordance with an aspect of the invention to maintain simultaneous connections with a plurality of wireless networks using a single radio. The multiple MAC states maintained by the ports 33 may be exposed to the operating system and used accordingly.

Each port 33 has a corresponding Virtual Network Interface Card (VNIC) 34 that the port 33 programs. The VNIC 34 provides all of the hardware level services that its corresponding port 33 needs, and is the virtualization aware portion of the port. That is, the radio hardware 4 may not necessarily be able to maintain actual simultaneous connections with multiple networks (e.g., because the communications may require sending/receiving on different channels), and thus the simultaneous connection to multiple networks is virtual at levels above the VNIC 34. Accordingly, the ports 33 and levels above the ports 33 (e.g., the operating system 2 and other applications) may operate as if the connection to two or more networks is always active even though such may not necessarily be the case. (As discussed in more detail below, the VNICs 34 and other miniport components may buffer signals as needed for later use in programming the radio hardware 4 and/or otherwise effect communication with the corresponding wireless network.) In this embodiment, one of the ports 33 is a default port that manages port functionality as it is effected by virtualization. For example, the default port 33 may control the creation and deletion of new ports as they are needed/not needed, as well as a scan state and scan list management for the ports 33. The VNICs 34 communicate with a hardware virtualization layer (HVL) 35 which multiplexes/demultiplexes signals between the various VNICs 34 and the physical radio hardware 4. The HVL 35 periodically provides each VNIC 34 access to the radio hardware 4, enabling the VNIC 34 to transfer the state from the VNIC 34 to the radio hardware 4 and use the radio hardware 4 for wireless communication with a corresponding network 5 on behalf of the corresponding port 33.

The HVL 35 is responsible for managing the virtualization of hardware between various ports 33, and performs this by keeping track of a currently active "context," which is a list of ports 33 that currently have access to the radio hardware 4. Ports 33 which do not have access to the radio hardware 4 during the active context are maintained as a list of inactive contexts. More than one port 33 may be included in an active context if they can mutually coexist, e.g., if all of the ports 33 use the same PHY and channel number for communication with their corresponding wireless networks 5, and none of the ports 33 use the same group key index. Thus, all ports 33 included in an active context may access the radio hardware 4 and engage in active communication with their corresponding wireless networks 5. The HVL 35 may also maintain a list of all Basic Service Set IDs (BSSIDs) that indicates the set of BSSIDs for which packets will be accepted, a mapping table to map incoming packets to the corresponding MAC state/ port 33, and/or scan information received in a last scan (e.g., to help optimize passive scans). The HVL 35 and the default port 33 may consolidate common operations for different ports in a context (or multiple contexts), and perform those common operations only once, potentially making functioning of the radio hardware 4 more efficient. For example, background scanning may be performed once and the information used for several ports 33, eliminating any need to perform background scanning for each individual port 33.

Since each VNIC 34 provides hardware access for its corresponding port 33, the port 33 may function without being aware of whether it is currently included in an active context or not. Thus, a port 33 currently included in an inactive context is permitted to perform activities, e.g., regarding reprogramming the radio hardware 4, since its corresponding VNIC 34 provides simulated radio hardware for access to the port 33. At the next context switch when the port 33 is included in an active context, the VNIC 34 works with the HVL 35 to get the appropriate programming of the radio hardware 4 completed and perform other functions needed to effect communication with the corresponding network.

Accordingly, with this arrangement, the computer 10 may maintain a simultaneous virtual connection with two or more wireless networks via a single set of radio hardware 4. That is, although the computer 10 may include multiple sets of radio hardware 4, the computer 10 may operate so as to have simultaneous virtual connections with two or more networks using only a single radio. From the view point of the ports 33 and other portions of the computer 10 at layers above the ports 33, such as the operating system 2, the computer 10 may operate as though connections with two or more wireless networks 5 are currently active. This may enable the computer 10 maintain simultaneous connections with an infrastructure network, such as a 802.11 wireless LAN and an adhoc network, such as a mesh network, and/or allow the computer to act as an access point for one or more networks. Other combinations simultaneous network connections will be apparent to those of skill in the art, such as maintaining simultaneous connections with two or more infrastructure networks, two or more adhoc networks, etc.

Such ability may provide a computer 10 with increased network flexibility and capabilities that were previously unavailable. For example, in a situation where the computer 10 and another client are both connected to a same wireless LAN via a common access point, the computer 10 may establish a direct, supplemental connection to the other client via an adhoc network. This may enable the computer 10 to directly receive information from the other client without requiring that information to be routed through the wireless LAN. In another example, the computer 10 may be connected to the Internet via wireless LAN, and share information received via the Internet with another device by way of an adhoc network connection to the device. Thus, the other device in the adhoc network may enjoy Internet connectivity via the computer 10 even though the other device in the adhoc network is unable to connect directly via the wireless LAN.

In another example, the computer 10 may perform its own sort of handoff or "soft handover" between wireless networks, e.g., when connectivity to one wireless network degrades. For example, the computer 10 may be simultaneously connected to two wireless networks, both of which provide a connection to the Internet. Initially, connectivity to a first wireless network may be superior, and thus the computer 10 may use the first network for its Internet access. Later, connectivity to the first network may degrade. Rather than lose the Internet connection, the computer 10 may use the connection to the second wireless network to maintain its Internet connection. In another embodiment, the computer 10 may function as a type of bridge or other interconnection between two mesh networks. For example, the computer 10, may be simultaneously connected between two or more mesh networks that otherwise have no overlap with each other. Information within the first mesh network may be relayed to the second mesh network via the computer 10.

In another aspect of the invention, the computer 10 may function as an access point for an 802.11 wireless network or other suitable network while also maintaining a simultaneous virtual connections with one or more other wireless networks, such as an adhoc network. Such functioning of the computer 10 as an access point may be enabled by the unique MAC state associated with the multiple ports 33. That is, a unique MAC state between the multiple ports 33 may be required for the computer 10 to function as an access point in a network while also maintaining a connection with other networks.

In accordance with another aspect of the invention, the computer 10 may not only be adapted to maintain simultaneous virtual connections with two or more wireless networks via a single set of radio hardware, but also may be adapted to maintain a simultaneously active connection with two or more wireless networks on a same channel. As discussed above, aspects of the invention allow two or more ports 33 to be simultaneously in direct communication with the radio hardware 4, provided that the ports 33 meet certain criteria such as using the same PHY and channel number and the ports 33 do not use the same group key index. As a result, two or more ports 33 may cause the radio hardware 4 to send and receive wireless signals with respect to two or more wireless networks over a same channel. As used herein, a simultaneously active connection with two or more networks means that two or more ports may communicate with a respective wireless network during a same active context. Simultaneous virtual connections allow for ports 33 to communicate with respective wireless networks 5 during different active contexts, but layers at the port level and above operate as though there is no restriction on access to the radio hardware 4. Of course, even in the simultaneous active connection where two or more ports 33 cause the radio hardware 4 to send and receive signals during a same active context, signals respectively sent and/or received in a wireless network must occur in a serial fashion.

In another aspect of the invention, the computer may send and/or receive wireless signals with respect to a first network on a first channel, and then send and/or receive wireless signals regarding a second network on the first channel without disconnecting from the first network. Typically, communication by a single radio with two different wireless networks requires that the radio first communicate with the first wireless network, and then disconnect from the first wireless network to establish a connection with the second network. However, as discussed above, aspects of the invention provide for the ability to communicate with two different wireless networks without disconnecting from the networks to enable communication with the other, whether the communication occurs during one or more active contexts. In one embodiment, the radio hardware 4 may be caused to advise one or more wireless networks that the radio hardware 4 and computer 10 are entering a power saving mode (or "sleep period") during which the network cannot communicate with the radio hardware 4. Thus, the devices in the wireless networks may be caused to buffer signals that would normally be sent to the computer 10 via the radio hardware 4 during the "sleep period." In reality, however, the radio hardware 4 may be switched for communication with one or more other wireless networks during the supposed "sleep period" (whether on the same or a different channel). When the radio hardware 4 and computer 10 are supposed to be awake, the radio hardware 4 may again be programmed to receive the buffered signals from the wireless network(s). Thus, the computer 10 may communicate with multiple wireless networks without disconnecting from any of the networks. This may allow the computer 10 to save the time and/or resources required to reestablish connections with the wireless networks. For example, some wireless networks require authentication protocols be followed for network security purposes. Disconnection from such networks typically requires that the radio hardware 4 perform a reauthentication process before being able to again communicate with the network. However, if the radio hardware 4 does not disconnect from the wireless network, no reauthentication process need be performed.

The following provides some additional information regarding the various functions handled by some of the components in the miniport driver 3. As mentioned above, the MP LAYER 31 handles the majority of miniport and non-802.11 specific interaction between the operating system 2 and the miniport driver 3. Some of these functions include:

- Handle miniport initialize/halt/pause/restart/surprise calls from the network driver interface specification NDIS— which is a Windows-provided intermediate layer typically arranged between networked devices drivers and the IP layer
- Manage synchronization of certain operations such as NDIS reset, power management, and others for all of the ports 33
- Handle most non-802.11 object identifiers (OIDs)

The MP/PORT interface 32 is an NDIS level interface that defines the contract between the MP layer 31 and the ports 33. Some of the functions include:

- Send packet
- Indicate receive
- Handle OID
- Indicate Status
- Pause/Restart/Port The HVL 35 may include an HVL interface that defines the contract between the VNICs 34 and the HVL layer 35. Some of the functions performed by the HVL interface include:

- Send packet
- Indicate receive
- Join a basic service set (BSS)
- Start/Stop AP/ad hoc network beaconing
- Notifications regarding changes to the virtualization state such as
  - Context switched to port
  - Context switched from port
  - Request context switch A hardware interface between the miniport driver 3 and the radio hardware 4 may function to program the physical radio hardware 4. Some of its functions may include:

- Send packet
- Indicate receive
- Handle interrupt
- Scan
- Set channel

In some situations when a port 33 is included in an active context, the port may attempt to program the radio hardware 4 in a way that cause conflicts with other ports included in the active context. For example, a port 33 may attempt a DOT11 reset that changes the hardware state, or a scan or "connect to an access point" operation that requires changing the channel used by the radio hardware 4. A port 33 seeking to perform such operation should not disrupt the other ports sharing the active context, and thus if a port 33 needs hardware programming to be completed to continue operation of the port, the port 33 should notify the VNIC 34 and HVL 35. Likewise, if a port 33 is performing a potentially disruptive hardware programming operation, the port 33 should notify the VNIC 34 and HVL 35. The HVL 35 may provide ports 33 with the ability to request, and receive, exclusive hardware access to perform these operations. If the HVL 35 grants a port 33 exclusive hardware access, the port can continue using the radio hardware 4 until it relinquishes its access. Thus, a port 33 may be able to perform its atomic hardware operation and/or hardware programming dependant activities during its exclusive hardware access period.

The HVL 35 may trigger a context change in response to any suitable criteria, such as an exclusive hardware access request by a port as discussed above, a context timeout (such as when the HVL 35 defines a time period that a context should stay active and the time period expires), and/or a notification from a port 33 or a VNIC 34 that it is operating in a low traffic mode and no longer requires to be included in the active context.

When a context is changed, variables for an IEEE 802.11 network that may need to be programmed on the radio hardware 4 include:

- Link state register
- Mode of operation (such as access point or client mode)
- BSSID
- Beacon interval
- Packet filter
- Encryption mode
- Encryption keys (e.g., including both pair wise and group keys)
- Hardware internal port specific state (such as rate negotiation statistics and others maintained by the radio hardware 4)

It should be appreciated that one implementation of embodiments in accordance with aspects of the invention includes at least one computer-readable medium (e.g., a computer memory, floppy disk, compact disk, tape etc.) encoded with a computer program (i.e., a plurality of instructions), which, when executed by a processor, performs the above-discussed functions. The computer-readable medium may be transportable such that the program stored thereon can be loaded on to any computer environment resource to implement various aspects of the invention. In addition, it should be appreciated that reference to a computer program which, when executed, performs the above-described functions, is not limited to an application program running on a host computer. Rather, the term computer program is used herein in a generic sense to reference any type of computer code (e.g., software or microcode) that may be employed to program a processor to implement various aspects of the invention. It should also be appreciated that in accordance with embodiments of the invention, when processes are implemented, the computer 10 during the course of execution, may receive manual input (e.g., from a user).

While aspects of the invention has been described with reference to various illustrative embodiments, the invention is not limited to the embodiments described. Thus, it is evident that many alternatives, modifications, and variations of the embodiments described will be apparent to those skilled in the art. Accordingly, embodiments of the invention as set forth herein are intended to be illustrative, not limiting, various changes may be made without departing from the spirit and scope of the invention.

The invention claimed is:

1. A computer comprising:
a processor for executing instructions;
a set of computer executable instructions that, when executed by the processor, form a single operating system for the computer, the operating system for controlling operations of the computer;
a radio constructed and arranged to send and receive wireless signals for communication with at least one device in a wireless network;
a plurality of ports, each of the ports being respectively associated with a corresponding unique wireless network and maintaining a MAC state that is unique from other ports associated with a wireless network, the port handling signals regarding wireless signals to be sent by the radio to, and wireless signals received from, the wireless network associated with the port; and
a hardware interface that includes the plurality of ports and includes:
a plurality of virtual NICs that are respectively associated with a wireless network and a port, each of the virtual NICs being adapted to send and receive signals for the corresponding port regarding wireless communications on the wireless network; and
a hardware virtualization layer that multiplexes connections between the virtual NICs and the radio to allow direct communication between the virtual NICs and the radio;
wherein the computer is adapted to maintain a simultaneous virtual connection with two or more wireless networks via the radio.

2. The computer of claim 1, wherein the MAC state is defined at least in part by a MAC address that is unique from MAC addresses associated with other ports associated with a respective wireless network.

3. The computer of claim 1, wherein the computer is adapted to maintain a simultaneously active connection with the two or more wireless networks on a same channel.

4. The computer of claim 1, wherein the computer is adapted to send and/or receive wireless signals on a first network on a first channel, and then send and/or receive wireless signals on a second network on the first channel or on a second channel without disconnecting from the first network.

5. The computer of claim 1, wherein computer is adapted to function as an access point for at least one of the wireless networks.

6. The computer of claim 1, wherein the two or more wireless networks include a first wireless network that requires authentication of the computer to enable communication in the first wireless network, and the computer is adapted to communicate with the first network, then communicate with a second wireless network, then communicate again with the first wireless network without performing an authentication procedure for a second time.

7. The computer of claim 1, wherein the two or more wireless networks includes at least one infrastructure network or adhoc network.

8. A network miniport driver for a computer, comprising:
a hardware interface that is adapted to communicate directly with radio hardware to provide control signals to the radio hardware and to receive information regarding wireless signals received by the radio hardware from one or more wireless networks, the hardware interface including:
a plurality of ports that are each associated with a unique wireless network, each of the ports maintaining a MAC state that is different from the MAC state of other ports;
a plurality of virtual NICs that are each respectively associated with a wireless network and the corresponding port, each of the virtual NICs being adapted to send and receive signals for the corresponding port regarding wireless communications on the wireless network; and
a hardware virtualization layer that multiplexes connections between virtual NICs and the radio hardware to allow direct communication between a virtual NIC and the radio hardware.

9. The driver of claim 8, wherein the MAC state is defined at least in part by a MAC address that is unique from MAC addresses associated with other ports of the hardware interface.

10. The driver of claim 8, wherein the driver is adapted to maintain a simultaneously active connection with the two or more wireless networks, which each correspond to a respective port, on a same channel.

11. The driver of claim 8, wherein the driver is adapted to send and/or receive wireless signals on a first network on a first channel via the radio hardware, and then send and/or receive wireless signals on a second network on the first channel or a second channel via the radio hardware without disconnecting from the first network.

12. The driver of claim 8, wherein one of the ports is adapted to function as an access point for the corresponding wireless network.

13. The driver of claim 8, wherein the wireless network for one of the ports requires authentication of the computer to enable communication in the first wireless network, and the driver is adapted to provide communication with the first network, then provide communication with a second wireless network, then provide communication again with the first wireless network without performing an authentication procedure for a second time.

14. The driver of claim 8, wherein the two of more wireless networks includes at least one infrastructure network, an IEEE 802.11 network, or adhoc network.

15. The driver of claim 8, wherein the hardware virtualization layer controls which of the virtual NICs and associated port is actively connected to the radio hardware.

16. The driver of claim 8, wherein the port sends information to the radio hardware via the hardware virtualization layer regarding information to be included in wireless signals to be sent to the corresponding wireless network, a channel on which the radio hardware is to communicate with the wireless network, and/or authentication settings for the wireless network.

17. A method of managing communication of a computer with multiple wireless networks, the computer including radio hardware for sending and receiving communications with the wireless networks, the method comprising:
creating a plurality of ports that are each associated with a unique wireless network, each of the ports maintaining a MAC state that is different from the MAC state of other ports;

providing a plurality of virtual NICs that are each respectively associated with a corresponding port and wireless network, each of the virtual NICs being adapted to send and receive signals for the corresponding port regarding wireless communications on the wireless network; and providing a hardware virtualization layer that multiplexes connections between the virtual NICs and the radio hardware to allow direct communication between a virtual NIC and the radio hardware.

18. The method of claim 17, further comprising:
maintaining a simultaneous virtual connections with the multiple wireless networks, each of the wireless networks corresponding to a respective port.

19. The method of claim 17, further comprising:
conducting simultaneous active communications with two or more wireless networks on a same channel using the same radio hardware.

* * * * *